Patented Apr. 4, 1939

2,153,311

UNITED STATES PATENT OFFICE 2,153,311

PROCESS FOR PREPARING 2-KETO-ALDONIC ACIDS AND THEIR SALTS

Richard Pasternack, Brooklyn, N. Y., and Peter P. Regna, North Bergen, N. J., assignors to Charles Pfizer & Company, Brooklyn, N. Y., a corporation of New Jersey No Drawing. Application September 1, 1938, Serial No. 227,964

7 Claims. (Cl. 260—535)

This invention relates to the production of 2-keto-aldonic acids and 2-keto-aldonates and has for its object to provide a new and improved process for this purpose.

2-keto-aldonic acids (osonic acids) have heretofore been prepared by the following methods:

1. Oxidation of osones by means of bromine. (Neuberg and Kitasato - Biochem. Ztschr. 183:485–8, 1927), (Michael, Kraft and Lohman-Z. physiol. Chem. 225:13–27, 1934).

2. Oxidation of keto sugars such as levulose and sorbose by means of nitric acid (Haworth, British Patent #443,901) or by oxygen and platinum catalyst (Merck, British patent application #12,967).

3. Oxidation of suitable acetone sugars by means of permanganate in alkaline solution. By this method, Ohle (Berichte 58B:2577–84, 1925) produced 2-keto-d-gluconic acid from β-diacetone fructose and Reichstein and Grüssner (Helv. Chem. Acta. 17:311–28, 1934) made by the same procedure 2-keto-1-gulonic acid from diacetone sorbose.

We have now found that the 2-keto-acids can be made from the corresponding aldonic acids or their salts by oxidation with chromic acid. This specific oxidation by chromic acid was unexpected inasmuch as other oxidizing agents produce different oxidation products. For instance, $H_2O_2$ and a ferric iron catalyst convert the salts of aldonic acids to sugars having one carbon less than the aldonic acid (Ruff, Berichte: 31:1574, 1898). Bromine or nitric acid form other keto acids. For instance, gluconic acid is converted to 5-keto gluconic acid (H. Kiliani, Ber. 55B:2817–26, 1922).

The oxidation is accelerated by the addition of small amounts of catalytically active substances such as nickel, cerium, iron, platinum and their salts.

Aqueous solutions of aldonic acids (equilibrium mixtures of lactones and acids) or salts such as calcium, barium, sodium and potassium can be oxidized.

A satisfactory oxidation is obtained with an aldonic acid or even with a salt of an aldonic acid and chromic acid without further adjustment of the acidity. When bichromates or chromates are used it is desirable to neutralize the alkali formed by the reduction of the chromate by the addition of an acid such as sulfuric acid or acetic acid. With excess of free sulfuric acid the oxidation is more rapid, but greater destruction of aldonic acid takes place. Oxidation is effectively carried out from 0° to about 60° C.

The solution to be oxidized may be purely aqueous or it may contain water-miscible organic solvents which are not readily attacked by chromic acid, such as tertiary butyl alcohol.

The theoretical amount of chromic acid gives a yield as high as 55% of theory of 2-keto acid, based on the aldonic acid introduced. However, when taking into consideration the recoverable unreacted aldonic acid, the yield is about 80%, so that only a relatively small loss is sustained by side reactions.

The chromium in solution after the oxidation forms a very strong complex with the sugar acids. It, therefore, cannot be removed by any known procedures. By reacting stoichiometric quantities of chromium salts and a soluble ferrocyanide, no precipitation takes place. However, we have found that on evaporating to dryness in acid solution the chromium ferrocyanide compound becomes insoluble and once insoluble cannot be redissolved even in boiling water.

After removal of the chromium the 2-keto acids may be separated as salts or esters.

By this oxidation method the epimers d-gluconic and d-mannonic acid have been converted to 2-keto-d-gluconic acid, as expected by the stereochemical relationship of the two acids, and the epimers 1-idonic and 1-gulonic acid have been converted to 2-keto-1-gulonic acid. Furthermore the 2-keto acids after isolation were converted to the corresponding ascorbic type acids. These facts proved definitely that the oxidation products obtained were 2-keto acids. There are no indications that other keto acids form in this reaction.

*Example 1.—Oxidation of d-gluconic acid to 2-keto-d-gluconic acid*

180 grams of glucono-δ-lactone were dissolved in 500 cc. of water and 10 grams of ferric sulphate were added. A solution of 70 grams of chromic acid in 100 cc. of water was added drop by drop, while the reaction mixture was cooled in an ice bath. After about 12 hours standing the chromium was all reduced. An analysis of Fehling's reduction method indicated the presence of 77 grams of 2-keto gluconic acid equal to about 40% of theory.

286 grams of calcium ferrocyanide $12H_2O$ and 19.1 grams of anhydrous barium acetate were added followed by 112 grams of oxalic acid $2H_2O$. The precipitates of calcium oxalate, ferric ferrocyanide and barium sulphate were filtered off, and the filtrate evaporated to dryness. The dry residue was extracted with methyl alcohol on reflux and the insoluble chromium ferrocyanide compound removed by filtration. The alcoholic filtrate was evaporated to a syrup and taken up with methyl alcohol containing 1% HCl. On standing until the next day, a crystallization of 2-keto gluconic methyl ester was obtained. Further quantities were obtained from the mother liquor. The ester was a white crystalline product, melting point 174–176° C.; rotation at equilibrium gives $[\alpha]_D = -76.8$ ($c=2.8$ grams/100 cc.); (see Ohle B.63,849, (1930)).

A portion of the methyl ester was converted to iso-ascorbic acid by the method of Maurer & Schiedt (Berichte 67B:1239–41, 1934). The iso-ascorbic acid was isolated in pure form having the following constants: M. P. 166° C. $[\alpha]_D = -17.7°$ (in concentration of 10 grams per 100 cc.). The iodine titration showed 99% purity.

*Example 2.—The oxidation of calcium-1-gulonate to 2-keto-1-gulonic acid*

247 grams of calcium-1-gulonate 3½ H₂O was dissolved in 1 liter of water containing 10 grams of ferric sulphate. After cooling, a solution of 70 grams of chromic acid was added dropwise. After 24 hours standing at room temperature an analysis by Fehling's method showed 41% (80 grams) 2-keto-1-gulonic acid. The oxidized solution was treated for the removal of the chromium, calcium and ferric sulphate as described in Example 1.

The alcoholic filtrate following the removal of the chromium ferrocyanide compound, was gradually evaporated with repeated crystallizations of gulonolactone (M. P.=185° C.). About 74 grams were obtained equivalent to 94 grams of calcium gulonate. Substracting this recovery, the yield is 70% on the gulonic acid used. When no more gulonolactone could be removed the alcoholic mother liquor was evaporated, and the residue taken up with a little water. To isolate the 2-keto-1-gulonic acid, the residue consisting of 2-keto-1-gulonic acid and 1-gulonic acid was treated with an amount of sodium hydroxide equivalent to the reducing acid present, as shown by titration with Fehling solution. The keto acids being much stronger than the aldonic acids, in a mixture of the two the sodium salts of the 2-keto-acids will preferentially form. The solution was then evaporated to a low volume and the alcohol-insoluble sodium 2-keto-gulonate was precipitated by the addition of methyl alcohol; $[\alpha]_D = -23.3°$ ($c=2$ grams) at equilibrium.

The calculated amount of sulphuric acid was added to a solution of 35 grams of this sodium salt. The solution was evaporated to dryness under diminished pressure; taken up with methyl alcohol, and the sodium sulphate filtered off. The filtrate was treated with 1½% of its weight of HCl gas and refluxed at atmospheric pressure for 2 hours. Upon subsequent evaporation, crystallization of the 2-keto-1-gulonic methyl ester took place. M. P.=155–156° C. (Reichstein and Gruessner, 155–157° C.).

25 grams of this ester was suspended in 75 cc. of methyl alcohol at 45° C. 5% over theoretical amount of sodium methylate was added, and the mixture heated at 40–45° C. (10 minutes), whereupon the calculated amount of sulphuric acid was added. The sodium sulphate was filtered off and the filtrate evaporated. The concentrated solution crystallized rapidly upon the addition of a few crystals of ascorbic acid. The material obtained had a melting point 189–191° C. and analyzed 99% ascorbic acid by an iodine titration. Rotation: $[\alpha]_D = +21°$ ($c=10$ grams/100 cc.).

*Example 3.—The oxidation of d-mannono-δ lactone to 2-keto-d-mannonic acid*

89 grams of d-mannono-δ-lactone was dissolved and treated with calcium carbonate to neutrality, after which 2.5 grams of ferric sulphate were added. Following this, a solution of 35 grams of chromic acid was added dropwise. After standing about 20 hours a determination by Fehling's reduction indicated a 41% yield as 2-keto-d-mannonic acid (identical with 2-keto-d-gluconic acid). The oxidized solution was treated for the removal of the chromium, calcium and ferric sulphate as described in Example 1.

The alcoholic filtrate following the removal of the ferrocyanide compound was evaporated and most of the unreacted mannono-δ-lactone was separated by crystallization. The remaining alcoholic solution was treated with methyl alcoholic HCl as in Example 1, and the methyl 2-keto-d-mannonate (or 2-keto-d-gluconate) obtained.

*Example 4.—The oxidation of 1-idonic acid to 2-keto-1-idonic (2-keto-1-gulonic) acid*

A solution containing 196 grams of 1-idonic acid was treated with calcium carbonate to neutrality and then 10 grams of ferric sulphate were added. A solution of 70 grams of chromic acid was slowly added, and after the addition of chromium the solution was acidified with 60 cc. of acetic acid. After 17 hours standing the solution analyzed 31.4% by Fehling's reduction (by allowing the solution to stand about 3 days the yield can be increased to about 40%). The oxidized solution was treated for the removal of the chromium, calcium and ferric sulphate as described in Example 1.

The alcoholic filtrate following the removal of the chromium was evaporated and subsequently taken up with water. An amount of sodium hydroxide equivalent to the reducing acids present was then added, and this solution evaporated to a syrup. The residue was taken up with methanol and after some standing the sodium 2-keto-1-idonate crystallized out having the same physical constants as the sodium 2-keto-1-gulonate given in Example 2. The sodium salt was treated as described in Example 2, i. e., esterified and then converted to ascorbic acid.

The invention claimed is:

1. Process which comprises oxidizing with chromic acid a substance selected from the group consisting of aldonic acids and their salts.

2. Process of preparing 2-keto-aldonic acids which comprises oxidizing aldonic acids by means of chromic acid in the presence of a catalyst selected from the group consisting of nickel, cerium, iron, platinum and their salts.

3. Process of preparing 2-keto-1-gulonic acid which comprises oxidizing 1-idonic acid by means of chromic acid.

4. Process of preparing 2-keto-1-gulonic acid which comprises oxidizing 1-gulonic acid by means of chromic acid.

5. Process of preparing 2-keto-d-gluconic acid which comprises oxidizing d-gluconic acid by means of chromic acid.

6. In the preparation of 2-keto-aldonic acids by chromic acid oxidation to aldonic acids, the steps of separating chromium from the reaction products in the form of an insoluble chromium ferrocyanide complex.

7. In the preparation of 2-keto-aldonic acids from aldonic acids, the step of isolating the 2-keto-aldonic acid product from the mixture containing unchanged aldonic acid by treating the mixture with a calculated amount of base corresponding to the 2-keto-aldonic acid present, and after concentrating the mixed solution by evaporation, treating with alcohol to precipitate the alcohol-insoluble salt of the 2-keto-acid.

RICHARD PASTERNACK.
PETER P. REGNA.

Certificate of Correction

Patent No. 2,153,311.   April 4, 1939.

RICHARD PASTERNACK ET AL

It is hereby certified that errors appear in the printed specification of the above numbered patent requiring correction as follows: Page 1, first column, line 22; same page, second column, line 28 two occurrences, and line 29; page 2, first column, lines 20, 21, 23, 29, 43, line 44 two occurrences, and line 63; same page, second column, line 26, line 27 two occurrences, lines 29, 49, and 50; lines 64, 65, 67, and 68, claims 3 and 4 respectively, for "1-" read *l-*; same page 2, first column, line 38, for "Substracting" read *Subtracting*; and second column, line 7, for "was" read *were*; line 75, claim 6, for "steps" read *step*; and that the said Letters Patent should be read with these corrections therein that the same may conform to the record of the case in the Patent Office.

Signed and sealed this 13th day of June, A. D. 1939.

[SEAL]

Henry Van Arsdale
*Acting Commissioner of Patents.* products in the form of an insoluble chromium ferrocyanide complex.

7. In the preparation of 2-keto-aldonic acids from aldonic acids, the step of isolating the 2-keto-aldonic acid product from the mixture containing unchanged aldonic acid by treating the mixture with a calculated amount of base corresponding to the 2-keto-aldonic acid present, and after concentrating the mixed solution by evaporation, treating with alcohol to precipitate the alcohol-insoluble salt of the 2-keto-acid.

RICHARD PASTERNACK.
PETER P. REGNA.

Certificate of Correction

Patent No. 2,153,311.      April 4, 1939.

RICHARD PASTERNACK ET AL

It is hereby certified that errors appear in the printed specification of the above numbered patent requiring correction as follows: Page 1, first column, line 22; same page, second column, line 28 two occurrences, and line 29; page 2, first column, lines 20, 21, 23, 29, 43, line 44 two occurrences, and line 63; same page, second column, line 26, line 27 two occurrences, lines 29, 49, and 50; lines 64, 65, 67, and 68, claims 3 and 4 respectively, for "1-" read *l-*; same page 2, first column, line 38, for "Substracting" read *Subtracting*; and second column, line 7, for "was" read *were*; line 75, claim 6, for "steps" read *step*; and that the said Letters Patent should be read with these corrections therein that the same may conform to the record of the case in the Patent Office.

Signed and sealed this 13th day of June, A. D. 1939.

[SEAL]      Henry Van Arsdale

*Acting Commissioner of Patents.*